US009790858B2

(12) United States Patent
Kanebako

(10) Patent No.: US 9,790,858 B2
(45) Date of Patent: Oct. 17, 2017

(54) INTAKE-AIR COOLING DEVICE

(71) Applicant: MITSUBISHI HITACHI POWER SYSTEMS, LTD., Kanagawa (JP)

(72) Inventor: Atsuhiko Kanebako, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 0 days.

(21) Appl. No.: 14/769,237

(22) PCT Filed: Jan. 28, 2014

(86) PCT No.: PCT/JP2014/051864
§ 371 (c)(1),
(2) Date: Aug. 20, 2015

(87) PCT Pub. No.: WO2014/156277
PCT Pub. Date: Oct. 2, 2014

(65) Prior Publication Data
US 2015/0377133 A1 Dec. 31, 2015

(30) Foreign Application Priority Data
Mar. 26, 2013 (JP) ................. 2013-064453

(51) Int. Cl.
*F02C 7/143* (2006.01)
*F02C 3/30* (2006.01)
(Continued)

(52) U.S. Cl.
CPC ............ *F02C 7/1435* (2013.01); *F01D 9/041* (2013.01); *F01D 25/12* (2013.01); *F02C 3/30* (2013.01);
(Continued)

(58) Field of Classification Search
CPC ......... F02C 7/1435; F02C 7/143; F02C 7/185
See application file for complete search history.

(56) References Cited

U.S. PATENT DOCUMENTS 6,478,289 B1 11/2002 Trewin
8,479,754 B2 * 7/2013 Hjerpe ............... B08B 3/02
134/104.2
(Continued)

FOREIGN PATENT DOCUMENTS

CN 1833099 9/2006
GB 2 429 937 3/2007
(Continued)

OTHER PUBLICATIONS

International Search Report dated Apr. 8, 2014 in corresponding International Application No. PCT/JP2014/051864.
(Continued)

*Primary Examiner* — Pascal M Bui Pho
*Assistant Examiner* — Stefan Ibroni
(74) *Attorney, Agent, or Firm* — Wenderoth, Lind & Ponack, L.L.P.

(57) ABSTRACT

An intake-air cooling device is disposed on a rear-stage side of a pre-filter disposed on an intake-air inlet side of an intake-air duct for guiding intake air taken in from an intake-air inlet to a compressor, for cooling the intake air by spraying water to the intake air. The intake-air cooling device includes a plurality of nozzles configured to spray the water to the intake air, a plurality of water conduit pipes including the plurality of nozzles arranged in an axial direction of the plurality of water conduit pipes, and a plurality of supply pumps configured to supply the water to a corresponding one of the plurality of water conduit pipes. Each of the plurality of water conduit pipes is an endless member which has a different perimeter.

7 Claims, 5 Drawing Sheets

(51) Int. Cl.
*F02C 7/04* (2006.01)
*F01D 9/04* (2006.01)
*F01D 25/12* (2006.01)
*F02C 9/16* (2006.01)
*F04B 17/03* (2006.01)
*F04B 49/06* (2006.01)

(52) U.S. Cl.
CPC .......... *F02C 7/04* (2013.01); *F02C 9/16* (2013.01); *F04B 17/03* (2013.01); *F04B 49/06* (2013.01); *F04B 2201/1201* (2013.01); *F04B 2203/0209* (2013.01); *F04B 2205/09* (2013.01); *F05D 2210/12* (2013.01); *F05D 2220/32* (2013.01); *F05D 2260/212* (2013.01); *F05D 2270/311* (2013.01)

(56) References Cited

U.S. PATENT DOCUMENTS

| | | |
|---|---|---|
| 2002/0083713 A1 | 7/2002 | Loebig et al. |
| 2004/0219079 A1 | 11/2004 | Hagen et al. |
| 2005/0076646 A1 | 4/2005 | Bolis et al. |
| 2005/0279101 A1 | 12/2005 | Hoffmann et al. |
| 2007/0000229 A1 | 1/2007 | Bevilacqua et al. |
| 2009/0173277 A1 | 7/2009 | Lew et al. |
| 2011/0052377 A1 | 3/2011 | Chamoto et al. |
| 2013/0174549 A1* | 7/2013 | Sediai .............. F02C 6/18 60/641.8 |

FOREIGN PATENT DOCUMENTS

| | | |
|---|---|---|
| JP | 7-77060 | 3/1995 |
| JP | 8-284685 | 10/1996 |
| JP | 11-13486 | 1/1999 |
| JP | 2000-352320 | 12/2000 |
| JP | 2001-234755 | 8/2001 |
| JP | 2002-201958 | 7/2002 |
| JP | 2005-511947 | 4/2005 |
| JP | 2006-508294 | 3/2006 |
| JP | 2006-523294 | 10/2006 |
| JP | 2007-535630 | 12/2007 |
| JP | 2009-162474 | 7/2009 |
| JP | 2011-111944 | 6/2011 |
| WO | 2004/111413 | 12/2004 |

OTHER PUBLICATIONS

Written Opinion of the International Searching Authority dated Apr. 8, 2014 in corresponding International Application No. PCT/JP2014/051864.
Taiwanese Office Action dated Oct. 23, 2015 in corresponding Taiwanese Patent Application No. 103102940 (with English Translation).
Taiwan IPO Notice of Allowance dated Jul. 18, 2016 in corresponding Taiwanese Application No. 103102940 (with English Translation).
Extended European Search Report dated Oct. 13, 2016 in corresponding European Application No. 14775523.5.
Office Action dated Jan. 27, 2017 in Japanese Patent Application No. 2013-064453 (with Machine Translation).

* cited by examiner

PRIOR ART

INTAKE-AIR COOLING DEVICE

TECHNICAL FIELD

The present invention relates to an intake-air cooling device which cools intake air introduced into a compressor of a gas turbine.

BACKGROUND

In a gas turbine for power generation including a compressor, a combustor, and a turbine, the output of the turbine is affected by the temperature of intake air suctioned into the compressor. For instance, in summer, when the ambient temperature is high, the density of the intake air decreases and the mass flow rate decreases, which results in a decrease in the output of the turbine. To prevent such a decrease in the output of the turbine, conventionally used is an intake-air cooling device which sprays coolant water to the intake air having a high temperature and cools the intake air by utilizing the evaporative latent heat of the water.

When intake air is cooled by an intake-air cooling device, if the relative humidity exceeds 100% due to over-fogging, the excessively sprayed mist turns into drain water. If such drain water enters a compressor at a wake flow side, there is a risk that the compressor gets locked, for instance, and gets out of order. Thus, it is necessary to adjust the amount of cooling medium, which is to be sprayed to the intake air, in accordance with atmospheric conditions such as a temperature and a humidity so as to prevent over-fogging when the intake air is cooled with the intake-air cooling device. Patent Literature 1 discloses an intake-air cooling device which includes a plurality of cooling-medium supply systems to adjust the amount of cooling medium which is to be sprayed to intake air and vaporizes a cooling medium efficiently so as to prevent over-fogging by switching each cooling-medium supply system between on and off in accordance with the atmospheric conditions.

CITATION LIST

Patent Literature

Patent Literature 1: JP2011-111944A

Problems to be Solved

Each cooling-medium supply system includes a pump for supplying a cooling medium from a tank and a water conduit pipe for guiding the cooling medium supplied from the pump to injection nozzles. Due to unevenness in the pressure distribution inside the water conduit pipe during introduction of the cooling medium from the pump to the water conduit pipe, variation is caused in the mist spray from the injection nozzles disposed on the water conduit pipe.

Especially during operation of partial cooling in which only a part of the cooling-medium supply systems is operated, variation in the mist spray from the nozzles appears remarkably. With the intake-air cooling device 60 disclosed in Patent Literature 1, it is possible to optimize spraying in the vertical direction with respect to a cross section of an intake-air duct to a certain extent, by using different pumps P1, P2, P3 respectively provided for cooling-medium supply systems L1 to L3 as illustrated in FIG. 7, during low-load operation in which partial cooling with an amount of water that is not the maximum is performed. However, the problem of variation in the amount of water sprayed due to the in-pipe pressure distribution remains in optimization of the amount of water sprayed in the lateral direction of the introduction pipes 61 to 65 included in the cooling-medium supply systems L1 to L3.

SUMMARY

The present invention was made in view of the above problem. An object of the invention is to provide a novel and improved intake-air cooling device capable of uniformly spraying water even during partial operation.

Solution to the Problems

One aspect of the present invention is an intake-air cooling device disposed on a rear-stage side of a pre-filter disposed on an intake-air inlet side of an intake-air duct for guiding intake air taken in from an intake-air inlet to a compressor, for cooling the intake air by spraying water to the intake air. The intake-air cooling device includes: a plurality of nozzles configured to spray the water to the intake air; a plurality of water conduit pipes including the plurality of nozzles arranged in an axial direction of the water conduit pipes; and a plurality of supply pumps configured to supply the water to corresponding one of the plurality of water conduit pipes. Each of the plurality of water conduit pipes is an endless member having a different perimeter.

According to one aspect of the present invention, since the nozzles are disposed in an endless fashion, variation of the in-pipe pressure is reduced even in partial operation of the intake-air cooling device, which makes it possible to spray water to the intake air uniformly. Thus, the intake-air cooling efficiency is improved.

In this case, in one aspect of the present invention, the plurality of nozzles may be arranged to have a distribution in which a density increases from a portion of the water conduit pipes connected to the supply pumps toward a portion opposite to the portion.

In this way, the nozzles are disposed less densely at a portion where the in-pipe pressure is high and more densely at a portion where the in-pipe pressure is low. Thus, variation of the amount of water sprayed per unit area is reduced, which makes it possible to spray a cooling medium to the intake air uniformly.

Further, in one aspect of the present invention, the water conduit pipes may be divided intermittently, and the water may be supplied to each divided section of the water conduit pipes from the supply pumps.

With the water conduit pipes being thus divided intermittently and each of the water conduit pipes having a shorter length, water is supplied uniformly to the divided water conduit pipes. Thus, even when the intake-air cooling device is in partial operation, it is possible to reduce the unevenness of the in-pipe pressure and to spray the cooling medium to the intake air uniformly.

Further, in one aspect of the present invention, the supply pumps may be variable-speed pumps capable of adjusting a flow rate of the water through inverter control.

In this way, it is possible to adjust the amount of spray from the nozzles more precisely after reducing the unevenness of the in-pipe pressure.

Further, in one aspect of the present invention, the supply pumps may be configured to adjust the flow rate of the water on the basis of at least one of a temperature of the intake air, a humidity of the intake air, an opening degree of inlet guide vanes of the compressor, and a load of a gas turbine.

In this way, after reducing the unevenness of the in-pipe pressure, it is possible to adjust the amount of spray from the nozzles more precisely in accordance with the condition of the intake air, an IGV opening degree of the compressor, or a load of the gas turbine.

Advantageous Effects

As described above, according to the present invention, it is possible to optimize and uniformize spray of water to the intake air in each of the vertical direction and the horizontal direction even during low-load operation in which partial cooling is performed.

DETAILED DESCRIPTION

Preferred embodiments of the present invention will now be described in detail. It is intended, however, that the following embodiments do not unduly limit the contents of the present invention described in the claims, and not all configurations described in the embodiments are necessarily required as a solution of the present invention.

First Embodiment

Figure 1:
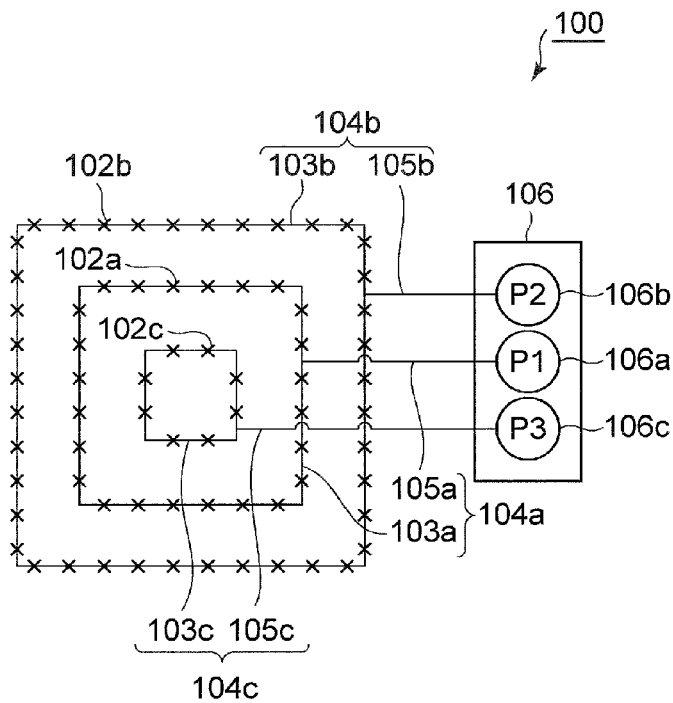
FIG. 1 is a schematic configuration diagram of an intake-air cooling device according to one embodiment of the present invention.

First, the configuration of an intake-air cooling device according to one embodiment of the present invention will be described with reference to the drawings. FIG. 1 is a schematic configuration diagram of an intake-air cooling device according to one embodiment of the present invention.

As illustrated in FIG. 1, an intake-air cooling device 100 of the present embodiment includes a plurality of nozzles 102a, 102b, 102c for spraying water to intake air, a plurality of water conduit pipes 104a, 104b, 104c in which the plurality of nozzles 102a, 102b, 102c is disposed in the axial direction of the pipes, and a plurality of supply pumps 106a, 106b, 106c for supplying water to the respective water conduit pipes 104a, 104b, 104c. Here, the above "intake air" refers to air taken in from an intake-air inlet of an intake-air duct described below to be introduced into a compressor.

Water supplied from the supply pumps 106a, 106b, 106c is respectively introduced to the nozzles 102a, 102b, 102c via the respective water conduit pipes 104a, 104b, 104c. That is, each of the supply pumps 106a, 106b, 106c has an independent water supply system.

Further, the water conduit pipes 104a, 104b, 104c respectively include nozzle arrangement parts 103a, 103b, 103c on which the nozzles 102a, 102b, 102c are disposed in the axial direction of the pipes, and introduction parts 105a, 105b, 105c for introducing water supplied from the supply pumps 106a, 106b, 106c to the nozzle arrangement parts 103a, 103b, 103c. In the present embodiment, the nozzles 102a, 102b, 102c are disposed concentrically in an endless fashion. Specifically, as illustrated in FIG. 1, the nozzle arrangement parts 103a, 103b, 103c are endless members having perimeters varied among the water conduit pipes 104a, 104b, 104c, and the nozzle arrangement parts 103a, 103b, 103c are disposed concentrically.

As described above, in the present embodiment, the nozzles 102a, 102b, 102c are disposed concentrically and in an endless fashion. Thus, during partial operation of the intake-air cooling device 100, even if water pressure from the supply pumps 106a, 106b, 106c decreases, variation in the in-pipe pressure of the water conduit pipes 104a, 104b, 104c is reduced. As a result, even in a case where the intake-air cooling device 100 is partially operated, it is possible to spray water to the intake air uniformly, which improves the intake-air cooling efficiency.

Figure 2:
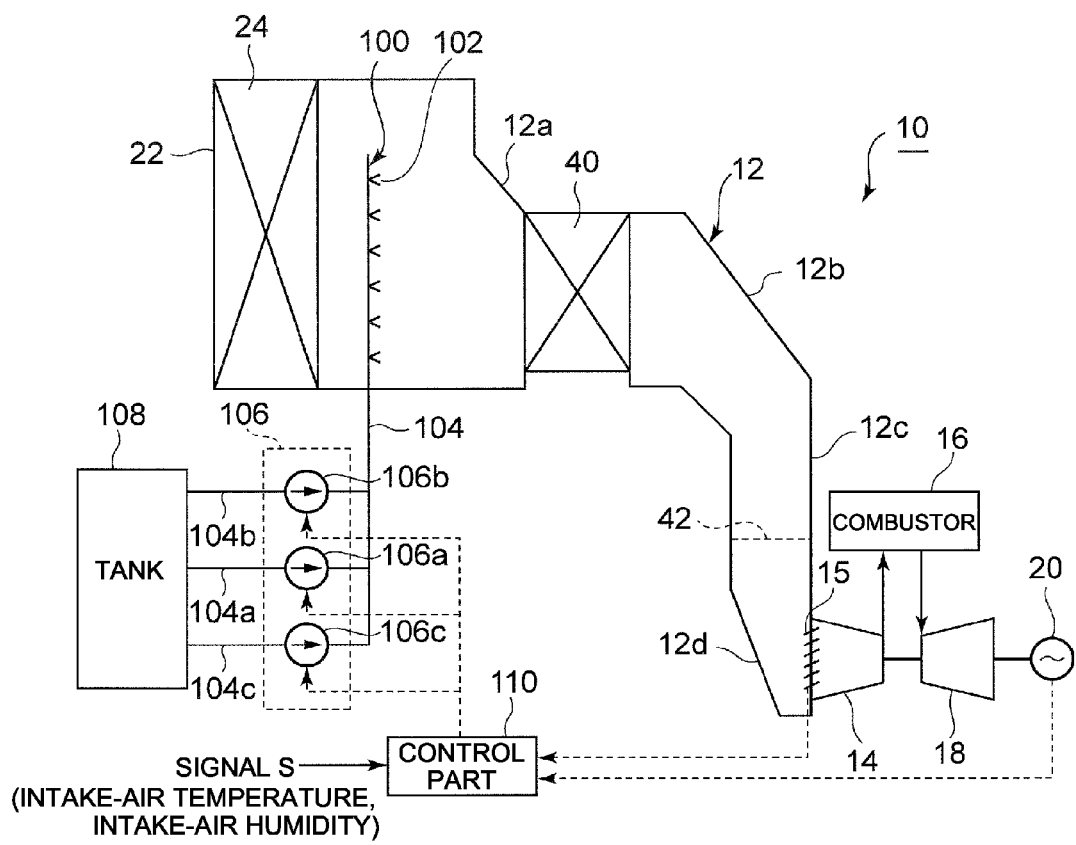
FIG. 2 is a block diagram showing a configuration of a gas turbine plant including an intake-air cooling device according to one embodiment of the present invention.

Next, the configuration of the intake-air cooling device according to one embodiment of the present invention will be described with reference to the drawings. FIG. 2 is a block diagram showing a configuration of a gas turbine plant including the intake-air cooling device according to one embodiment of the present invention.

A gas turbine plant 10 serving as a power generation plant includes an intake-air duct 12, a compressor 14, a combustor 16, a gas turbine 18, and a generator 20. Further, the gas turbine plant 10 includes the intake-air cooling device 100 for cooling intake air of the gas turbine 18.

The intake-air duct 12 guides the intake-air (ambient air: air) taken in from an intake-air inlet 22 to the compressor 14. The compressor 14 compresses the intake air supplied via the intake-air duct 12. An inlet guide vane (IGV) 15 is disposed on the inlet of the compressor 14. The IGV serves to fluctuate the opening degree to adjust the amount of air for combustion to be suctioned.

The opening degree of the IGV 15 is adjusted by a control part 110 in accordance with the output of the gas turbine 18, which is the load of the gas turbine 18. For instance, during partial-load operation, the angle of the IGV 15 with respect to the axial direction of the gas turbine 18 is increased, and control is performed to reduce the intake-air flow rate. Further, in the present embodiment, the control part 110 adjusts the flow rate of the water supplied from the supply pump 106 included in the intake-air cooling device 100, on the basis of the IGV opening degree of the compressor 14 or the load of the gas turbine 18.

The combustor 16 combusts fuel using the intake air supplied from the compressor 14. The gas turbine 18 is rotated by combustion gas supplied from the combustor 16. The generator 20 generates electric power from rotation of the gas turbine 18.

As illustrated in FIG. 2, the intake-air duct 12 includes a horizontal duct 12a, a curved duct 12b, and a vertical duct 12c from the upstream side in this order. A manifold part 12d is disposed at the downstream side of the vertical duct 12c for guiding the intake air to the compressor 14 while rectifying the flow of the intake air. In the present embodiment, the manifold part 12d extends downward via the vertical duct 12c bending downward in the vertical direction with respect to the horizontal duct 12a. While the intake-air duct 12 has a substantially L-shaped configuration in which the manifold part 12d at the downstream side extends downward in the present embodiment, the intake-air cooling device 100 of the present embodiment may be applied also to an intake-air duct configured to have a different shape such as a straight shape.

Further, a pre-filter 24 for removing relatively large dust or the like from intake air taken in from the intake-air inlet 22 is disposed at the intake-air inlet side of the intake-air duct 12. Further, at the rear stage of the pre-filter 24 inside the intake-air duct 12 (horizontal duct 12a), the intake-air cooling device 100 for spraying water to intake air that has passed through the pre-filter 24 to cool the intake air is disposed. That is, the intake-air cooling device 100 has a function to spray water to intake air which is to be introduced into the compressor 14 to cool the intake air.

The intake-air cooling device 100 includes the plurality of nozzles 102 for spraying water to intake air. Water is supplied to the nozzles 102 from a tank 108 via the supply pumps 106 (106a, 106b, 106c) provided respectively for the plurality of water conduit pipes 104 (104a, 104b, 104c).

In the present embodiment, variable-speed pumps capable of adjusting the flow rate of water through inverter control are used as the supply pumps 106 (106a, 106b, 106c) to adjust the amount of spray from the respective nozzles 102 (102a, 102b, 102c) more precisely, after reducing the unevenness in the in-pipe pressure of the water conduit pipes 104 (104a, 104b, 104c). Specifically, the supply pumps 106 make the amount of water injection variable by the control part 110, on the basis of at least one of a temperature of the intake air, a humidity of the intake air, an IGV degree of the compressor 14, and the load of the gas turbine 18.

That is, the supply pumps 106 introduce water to the water conduit pipes 104 so that the flow rate becomes more precise on the basis of the above-described varying factors. As a result, the intake air is cooled without causing overfogging. As described above, in the present embodiment, the nozzle arrangement parts 103a, 103b, 103c (see FIG. 1) of the water conduit pipes 104 are endless members. Thus, with the supply pumps 106 being variable-speed pumps, it is possible to adjust the amount of spray from the nozzles more precisely after reducing the unevenness in the in-pipe pressure by adjusting the flow rate of water to be sprayed and the number of pumps to be operated.

Further, inside the horizontal duct 12a of the intake-air duct 12, a silencer 40 for restricting vibration including sound that is generated during intake of air is disposed at the downstream side of the intake-air cooling device 100. Further, a filter 42 for removing, for instance, impure substances contained in the intake air introduced via the vertical duct 12c and a bolt or the like dropped during, e.g., work inside the intake-air duct is disposed at the inlet side of the manifold part 12d connected to the vertical duct 12c of the intake-air duct 12.

As described above, in the present embodiment, the nozzles 102a, 102b, 102c are disposed in an endless fashion via the nozzle arrangement parts 103a, 103b, 103c of the water conduit pipes 104. In this way, variation in the in-pipe pressure of the water conduit pipes 104 is reduced even during partial operation of the intake-air cooling device 100. Further, since the flow rate of water injection is adjustable in accordance with the IGV opening degree of the compressor 14, the load of the gas turbine, or the temperature or humidity of the intake air, it is possible to optimize water spray to intake air more precisely under a condition where the amount of water is not the maximum both in the vertical and horizontal directions, i.e., during partial load or partial cooling. Thus, it is possible to reduce the risk of water drops entering the compressor 14 of the gas turbine 18 as well as to improve the intake-air cooling efficiency.

Second Embodiment

Figure 3:
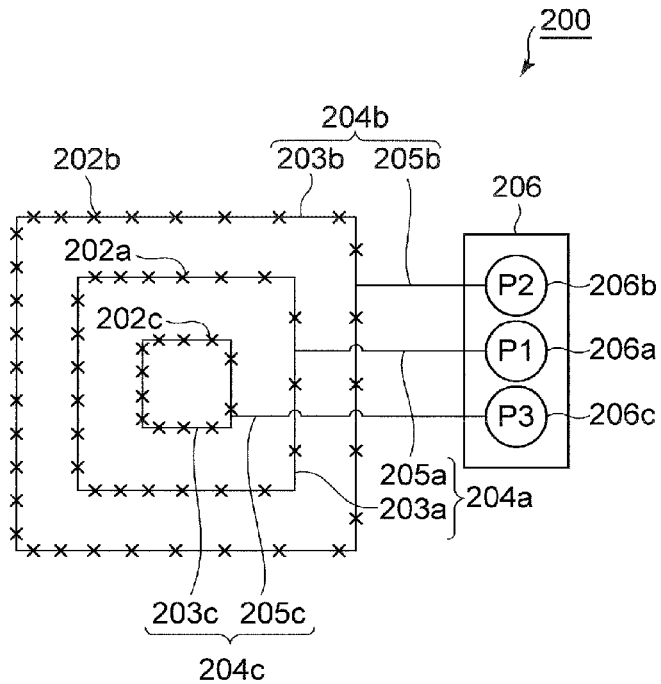
FIG. 3 is a schematic configuration diagram of an intake-air cooling device according to another embodiment of the present invention.

Next, the configuration of another embodiment of the intake-air cooling device of the present invention will be described with reference to the drawings. FIG. 3 is a schematic configuration diagram of an intake-air cooling device according to another embodiment of the present invention.

As illustrated in FIG. 3, an intake-air cooling device 200 of the present embodiment includes a plurality of nozzles 202a, 202b, 202c for spraying water to intake air, a plurality of water conduit pipes 204a, 204b, 204c on which the plurality of nozzles 202a, 202b, 202c is disposed in the axial direction of the pipes, and a plurality of supply pumps 206a, 206b, 206c for supplying water to the respective water conduit pipes 204a, 204b, 204c. Water supplied from the supply pumps 206a, 206b, 206c is respectively introduced to the nozzles 202a, 202b, 202c via the respective water conduit pipes 204a, 204b, 204c. That is, each of the supply pumps 206a, 206b, 206c has an independent water supply system.

Further, the water conduit pipes 204a, 204b, 204c respectively include nozzle arrangement parts 203a, 203b, 203c on which the nozzles 202a, 202b, 202c are respectively disposed, and introduction parts 205a, 205b, 205c for introducing water supplied from the supply pumps 206a, 206b, 206c to the above nozzle arrangement parts 203a, 203b, 203c. The nozzle arrangement parts 203a, 203b, 203c are endless members having perimeters varied among the water conduit pipes 204a, 204b, 204c, and the nozzle arrangement parts 203a, 203b, 103c are disposed concentrically.

In the present embodiment, the arrangement of the nozzles 202a, 202b, 202c is different from that of the first embodiment. Specifically, as illustrated in FIG. 3, the nozzles 202a, 202b, 202c are arranged in an endless fashion to have such a distribution that the density increases from a portion connecting the nozzle arrangement parts 203a, 203b, 203c and the introduction parts 205a, 205b, 205c toward a portion that is opposite to that portion. Specifically, the nozzles 202a, 202b, 202c at a portion in the vicinity of the supply pumps 206a, 206b, 206c having a high in-pipe pressure are arranged to be less dense, while the nozzles 202a, 202b, 202c at a portion opposite to that portion having a low in-pipe pressure are arranged to be dense.

Arranging the nozzles 202a, 202b, 202c as described above reduces variation of the amount of water sprayed per unit area, which makes it possible to spray water to intake air uniformly. Specifically, it is possible to make the amount of water sprayed per unit area more uniform between a portion in the vicinity of the supply pumps 206a, 206b, 206c having a high in-pipe pressure and a portion opposite to that portion having a low in-pipe pressure. As a result, variation of water sprayed to the intake air is reduced, and it is possible to improve the intake-air cooling efficiency.

Further, similarly to the first embodiment, variable-speed pumps capable of adjusting the flow rate of water through inverter control are used as the supply pumps 206 (206a, 206b, 206c) to adjust the amount of spray from the respective nozzles 202a, 202b, 202c more precisely after reducing the unevenness in the in-pipe pressure of the water conduit pipes 204a, 204b, 204c. Specifically, the supply pumps 206 make the amount of water injection variable on the basis of at least one of a temperature of the intake air, a humidity of the intake air, an IGV degree of the compressor 14, and the load of the gas turbine 18. Thus, with the supply pumps 206 being variable-speed pumps, it is possible to adjust the amount of spray from the nozzles more precisely after reducing the unevenness in the in-pipe pressure by adjusting the flow rate of water to be sprayed and the number of pumps to be operated.

Third Embodiment

Figure 4:
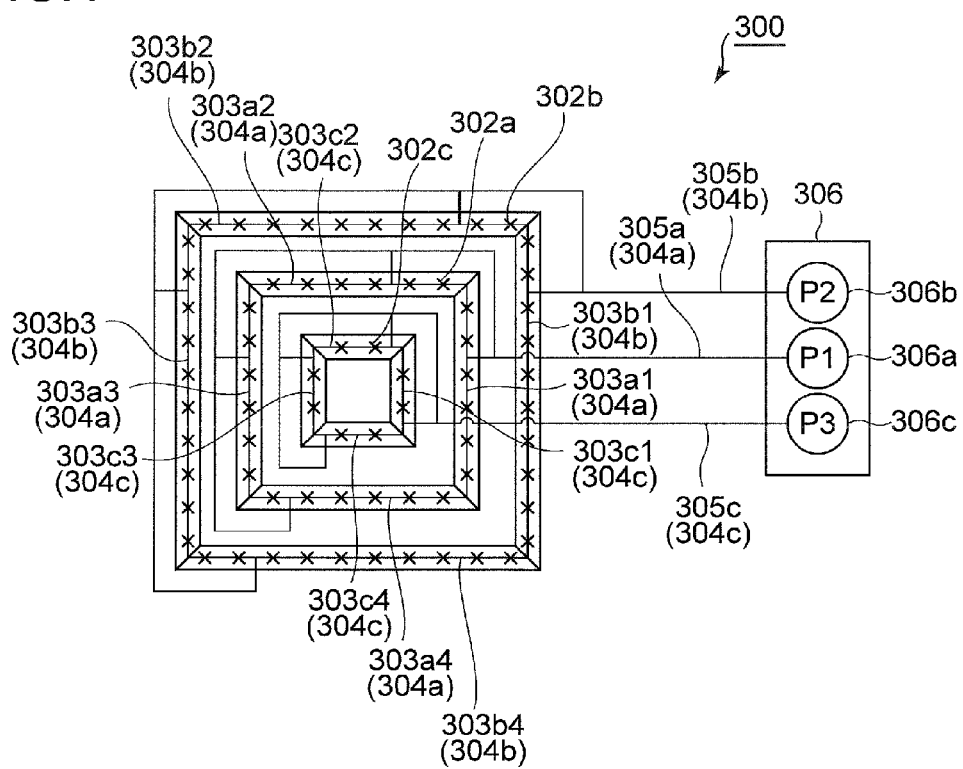
FIG. 4 is a schematic configuration diagram of an intake-air cooling device according to yet another embodiment of the present invention.

Next, the configuration of another embodiment of the intake-air cooling device of the present invention will be described with reference to the drawings. FIG. 4 is a schematic configuration diagram of an intake-air cooling device according to the another embodiment of the present invention.

As illustrated in FIG. 4, an intake-air cooling device 300 of the present embodiment includes a plurality of nozzles 302a, 302b, 302c for spraying water to intake air, a plurality of water conduit pipes 304a, 304b, 304c on which the plurality of nozzles 302a, 302b, 302c is disposed in the axial direction of the pipes, and a plurality of supply pumps 306a, 306b, 306c for respectively supplying water to the water conduit pipes 304a, 304b, 304c. Water supplied from the supply pumps 306a, 306b, 306c is respectively introduced to the nozzles 302a, 302b, 302c via the respective water conduit pipes 304a, 304b, 304c. That is, each of the supply pumps 306a, 306b, 306c has an independent water supply system.

Further, the water conduit pipes 304a, 304b, 304c respectively include nozzle arrangement parts 303a1 to 303a4, 303b1 to 303b4, 303c1 to 303c4 on which the respective nozzles 302a, 302b, 302c are disposed, and introduction parts 305a, 305b, 305c for introducing water supplied from the supply pumps 306a, 306b, 306c to the above nozzle arrangement parts 303a1 to 303a4, 303b1 to 303b4, 303c1 to 303c4. The nozzle arrangement parts 303a1 to 303a4, 303b1 to 303b4, 303c1 to 303c4 are endless members having perimeters varied among the water conduit pipes 304a, 304b, 304c, and the nozzle arrangement parts 303a1 to 303a4, 303b1 to 303b4, 303c1 to 303c4 are disposed concentrically.

The present embodiment is different from the first embodiment in the configuration of the nozzle arrangement parts 303a1 to 303a4, 303b1 to 303b4, 303c1 to 303c4 of the water conduit pipes 304a, 304b, 304c. Specifically, as illustrated in FIG. 4, the nozzle arrangement parts 303a1 to 303a4, 303b1 to 303b4, 303c1 to 303c4 are divided intermittently, and water is supplied to each divided section of the nozzle arrangement parts 303a1 to 303a4, 303b1 to 303b4, 303c1 to 303c4 from the supply pumps 306a, 306b, 306c. Specifically, the nozzle arrangement parts 303a1 to 303a4, 303b1 to 303b4, 303c1 to 303c4 are divided intermittently to shorten the length of each of the nozzle arrangement parts 303a1 to 303a4, 303b1 to 303b4, 303c1 to 303c4, and the nozzle arrangement parts 303a1 to 303a4, 303b1 to 303b4, 303c1 to 303c4 are disposed so as to form endless members.

In the present embodiment, as illustrated in FIG. 4, the nozzle arrangement parts 303a1 to 303a4, 303b1 to 303b4, 303c1 to 303c4 are rectangular endless members formed by being divided into sides. Here, the nozzle arrangement parts 303a1 to 303a4, 303b1 to 303b4, 303c1 to 303c4 are not limited to those illustrated in FIG. 4 divided into four sections, and may be divided intermittently into five or more sections to further reduce unevenness in the in-pipe pressure, for instance, and water may be supplied to each divided pipe channel with the supply pumps.

As described above, the nozzle arrangement parts 303a1 to 303a4, 303b1 to 303b4, 303c1 to 303c4 are divided intermittently to shorten each length. In this way, variation in the in-pipe pressure of each divided section of the nozzle arrangement parts 303a1 to 303a4, 303b1 to 303b4, 303c1 to 303c4 is reduced, which makes it easier to supply water uniformly. Thus, even during partial operation of the intake-air cooling device 300, it is possible to reduce unevenness of the in-pipe pressure and to spray water to intake air uniformly. Further, with the nozzle arrangement parts 303a1 to 303a4, 303b1 to 303b4, 303c1 to 303c4 having an intermittently divided structure, it is possible to produce divided sections first and then join the divided sections to form the nozzle arrangement parts 303a1 to 303a4, 303b1 to 303b4, 303c1 to 303c4. As a result, it is possible to produce the nozzle arrangement parts having an endless form easily, which improves the efficiency in producing the intake-air cooling device 300 with the nozzle arrangement parts.

Further, in the present embodiment, similarly to the first embodiment, variable-speed pumps capable of adjusting the flow rate of water through inverter control are used as the supply pumps 306 (306a, 306b, 306c) to adjust the amount of spray from the respective nozzles 302a, 302b, 302c more precisely after reducing the unevenness in the in-pipe pressure in the water conduit pipes 304a, 304b, 304c. Specifically, the supply pumps 306 make the amount of water injection variable on the basis of at least one of a temperature of the intake air, a humidity of the intake air, an IGV degree of the compressor 14, and the load of the gas turbine 18. With the supply pumps 306 being variable-speed pumps as described above, it is possible to adjust the amount of spray from the nozzles more precisely after reducing the unevenness in the in-pipe pressure by adjusting the flow rate of water to be sprayed and the number of pumps to be operated.

Figure 5A:
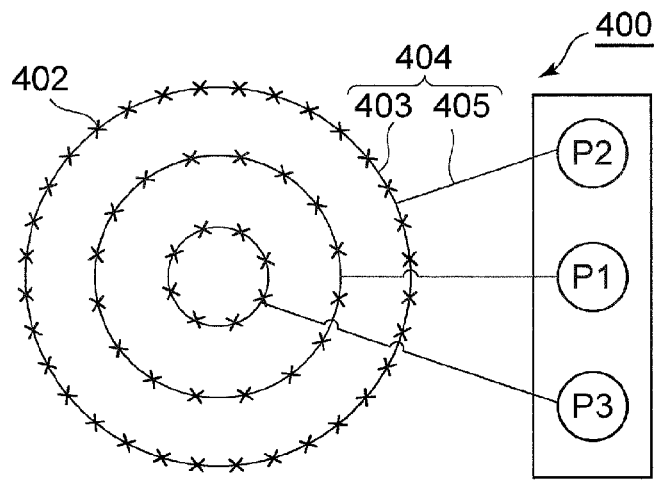
FIGS. 5A to 5C are schematic configuration diagrams of modified examples of the intake-air cooling devices according to the respective embodiments of the present invention.
Figure 5B:
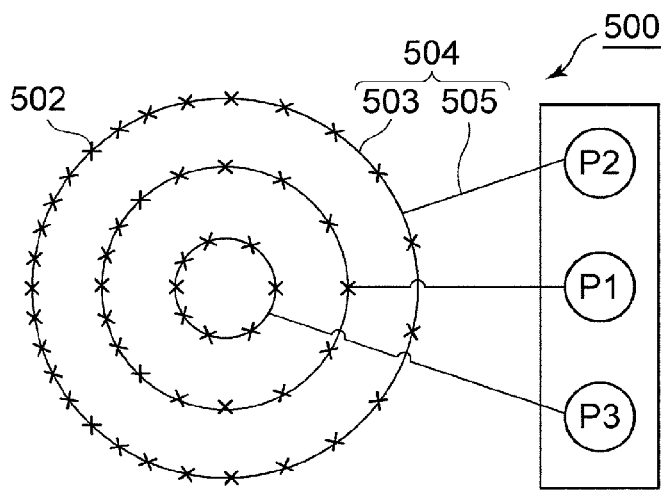
Figure 5C:
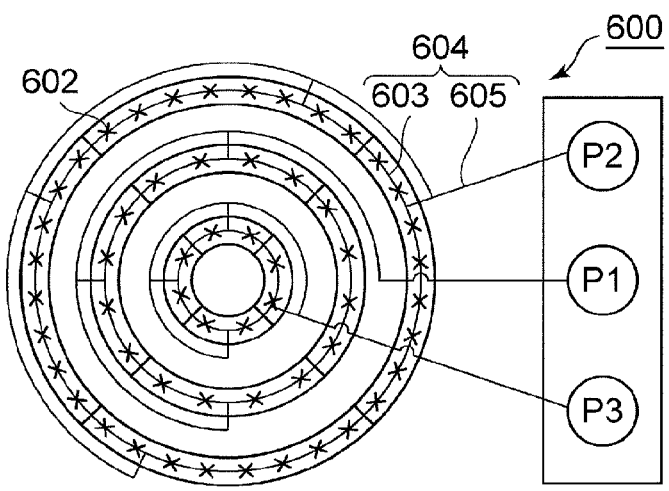

While the nozzle arrangement parts of the water conduit pipes of the intake-air cooling device have a rectangular shape in each of the above first to third embodiments, the nozzle arrangement parts only need to be endless members. Thus, the shape is not limited to a rectangle. Specifically, it is sufficient if water conduit pipes having the same shape are arranged in a concentric fashion. For instance, as illustrated in FIGS. 5A, 5B, 5C, each of nozzle arrangement parts 403, 503, 603 may have an annular structure of a substantially circular shape, or may be endless members having other shapes including an ellipse shape and a polygon shape other than a rectangle such as a triangle and a pentagon.

Further, while the nozzle arrangement parts of the water conduit pipes of the intake-air cooling device are disposed in a concentric fashion in each of the first to third embodiments, the nozzle arrangement parts only need to be at least endless members and to have different perimeters. Thus, the arrangement is not limited to a concentric fashion. Specifically, it is sufficient if water conduit pipes having the same shape are arranged in an endless fashion with perimeters different from one another.

Figure 6A:
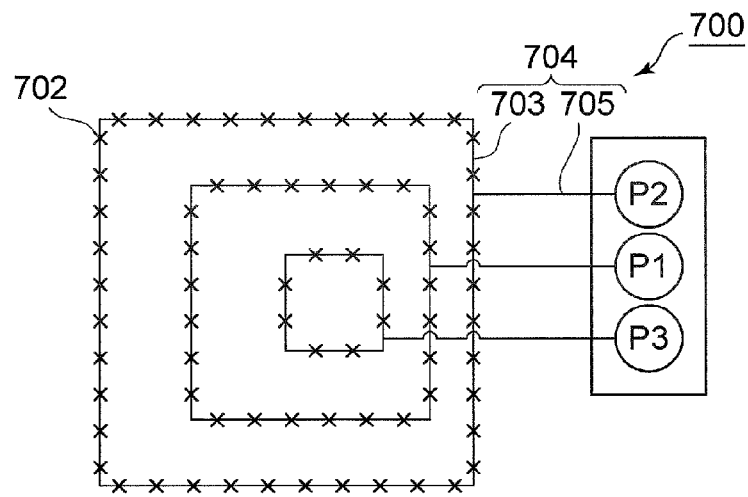
FIGS. 6A to 6C are schematic configuration diagrams of modified examples of the intake-air cooling devices according to the respective embodiments of the present invention.
Figure 6B:
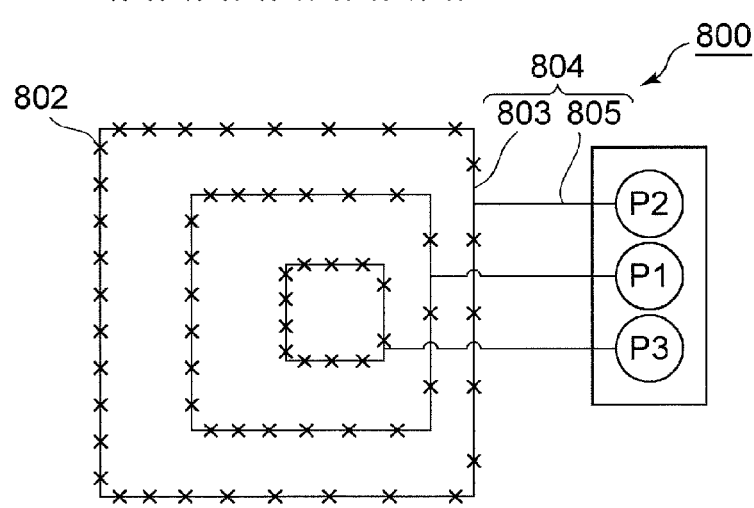
Figure 6C:
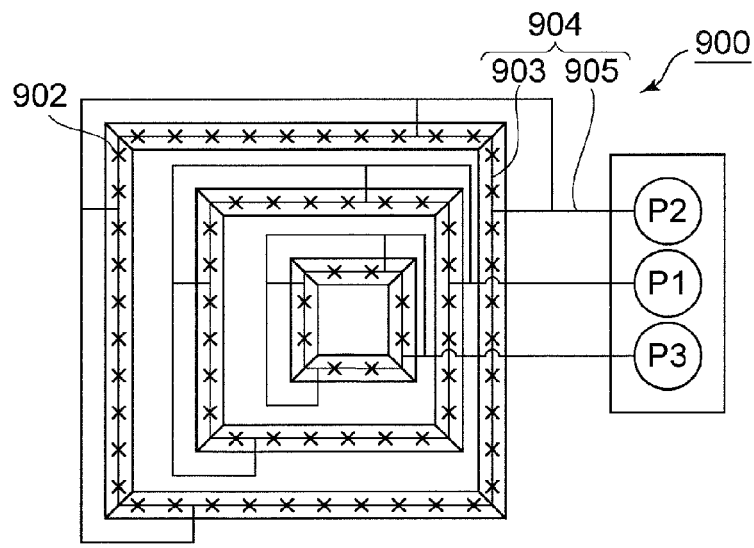
Figure 7:
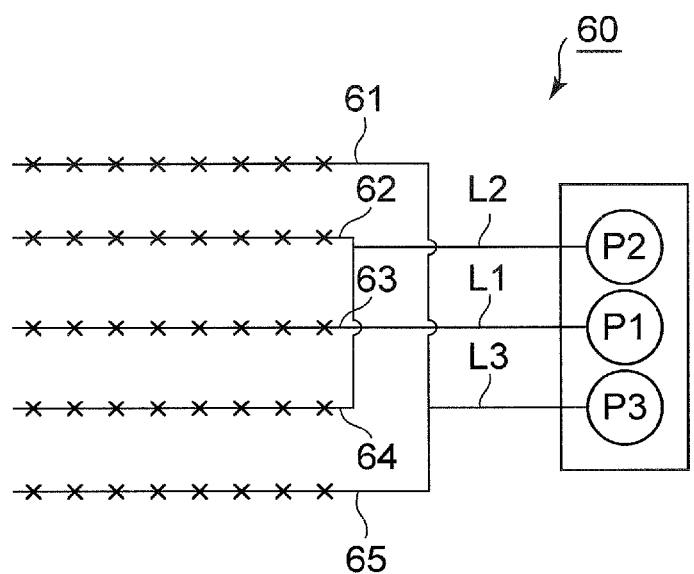
FIG. 7 is a schematic configuration diagram of a conventional intake-air cooling device.

For instance, as illustrated in FIGS. 6A, 6B, 6C, nozzle arrangement parts 703, 803, 903 may be arranged not in a concentric fashion but in an arrangement in which the nozzle arrangement parts are eccentric to each other. At this time, in a case where the nozzle arrangement parts 703, 803, 903 are disposed eccentrically, it is particularly desirable to arrange the same so that nozzles 802 have a density that increases from the side close to pumps P1, P2, P3 toward the side far from the pumps P1, P2, P3 as illustrated in FIG. 6B, in order to reduce variation of water spray.

The embodiments of the present invention have been described in detail above, but the present invention is not limited thereto, and one skilled in the art would readily understand that various modifications may be implemented within a scope that does not substantially depart from the novel features and advantageous effects of the present invention. Thus, such modifications are all included in the scope of the present invention.

For instance, if a term is described along with another term that has a wider or similar meaning at least once in the present specification or drawings, the term can be paraphrased by the other term at any part of the specification or the drawings. Further, the configuration and operation of the gas turbine plant and the intake-air cooling device are not limited to those described in the embodiments of the present invention, and may be modified in various ways when implemented.

DESCRIPTION OF REFERENCE NUMERALS

10 Gas turbine plant
12 Intake-air duct
12a Horizontal duct
12b Curved duct
12c Vertical duct
12d Manifold part
14 Compressor
14a Inlet (of compressor)
15 Inlet guide vane (IGV)
16 Combustor
18 Gas turbine
20 Generator
22 Intake-air inlet
24 Pre-filter
40 Silencer
42 Filter
100 Intake-air cooling device
102 Nozzle
103a, 103b, 103c Nozzle arrangement part
104 Water conduit pipe
105a, 105b, 105c Introduction part
106 Supply pump
108 Tank
110 Control part

The invention claimed is:

1. An intake-air cooling device disposed on a rear-stage side of a pre-filter disposed on an intake-air inlet side of an intake-air duct for guiding intake air taken in from an intake-air inlet to a compressor, for cooling the intake air by spraying water to the intake air, the intake-air cooling device comprising:
 a plurality of nozzles configured to spray the water to the intake air;
 a plurality of water conduit pipes on which the plurality of nozzles is disposed in an axial direction of the plurality of water conduit pipes; and
 a plurality of supply pumps provided for the plurality of water conduit pipes, respectively, and configured to supply the water to a corresponding one of the plurality of water conduit pipes,
 wherein the plurality of water conduit pipes includes a plurality of endless members, respectively,
 wherein each of the plurality of endless members includes at least one nozzle arrangement part on which at least one of the plurality of nozzles is disposed in the axial direction of the plurality of water conduit pipes,
 wherein each of the plurality of endless members has a perimeter that is different from other ones of the plurality of endless members, the plurality of endless members being arranged concentrically or eccentrically,
 wherein the plurality of water conduit pipes includes a plurality of introduction parts, respectively, the plurality of introduction parts being connected to the plurality of endless members, respectively, and being configured to supply the water from the plurality of supply pumps to the plurality of endless members, respectively, and
 wherein, in each of the plurality of endless members, the at least one of the plurality of nozzles is arranged such that a distribution density of the at least one of the plurality of nozzles increases as a distance from a connecting portion between a corresponding one of the plurality of endless members and a corresponding one of the plurality of introduction parts increases in the axial direction of the plurality of water conduit pipes.

2. The intake-air cooling device according to claim 1, wherein the supply pumps are variable-speed pumps capable of adjusting a flow rate of the water through inverter control.

3. The intake-air cooling device according to claim 2, wherein the supply pumps are configured to adjust the flow rate of the water on the basis of at least one of a temperature of the intake air, a humidity of the intake air, an opening degree of inlet guide vanes of the compressor, and a load of a gas turbine.

4. The intake-air cooling device according to claim 1, wherein each of the plurality of endless members has a rectangular perimeter.

5. An intake-air cooling device disposed on a rear-stage side of a pre-filter disposed on an intake-air inlet side of an intake-air duct for guiding intake air taken in from an intake-air inlet to a compressor, for cooling the intake air by spraying water to the intake air, the intake-air cooling device comprising:
 a plurality of nozzles configured to spray the water to the intake air;
 a plurality of water conduit pipes on which the plurality of nozzles is disposed in an axial direction of the plurality of water conduit pipes; and
 a plurality of supply pumps provided for the plurality of water conduit pipes, respectively, and configured to supply the water to a corresponding one of the plurality of water conduit pipes, wherein the plurality of water conduit pipes includes a plurality of endless members, respectively, wherein each of the plurality of endless members includes a plurality of nozzle arrangement parts on which at least one of the plurality of nozzles is disposed in the axial direction of the plurality of water conduit pipes,
 wherein each of the plurality of endless members has a perimeter that is different from other ones of the plurality of endless members, the plurality of endless members being arranged concentrically or eccentrically, and
 wherein, in each of the plurality of endless members, all of the nozzle arrangement parts are connected to each other, all of the nozzle arrangement parts are partitioned from one another, and the water supplied to a corresponding one of the plurality of water conduit pipes is supplied to the nozzle arrangement parts included in the corresponding one of the plurality of water conduit pipes, and wherein, in each of the plurality of endless members, all of the nozzle arrangement parts connected to and partitioned from each other are configured to be supplied with the water by a corresponding one of the plurality of supply pumps connected to each of the plurality of endless members, such that each corresponding one of the plurality of supply pumps is fluidly connected to each of the nozzle arrangement parts of each of the plurality of endless members.

6. The intake-air cooling device according to claim 5, wherein the supply pumps are variable-speed pumps capable of adjusting a flow rate of the water through inverter control.

7. The intake-air cooling device according to claim 6, wherein the supply pumps are configured to adjust the flow rate of the water on the basis of at least one of a temperature of the intake air, a humidity of the intake air, an opening degree of inlet guide vanes of the compressor, and a load of a gas turbine.

\* \* \* \* \*